(12) United States Patent
Hershey et al.

(10) Patent No.: US 9,024,779 B2
(45) Date of Patent: May 5, 2015

(54) POLICY BASED DATA MANAGEMENT AND IMAGING CHIPPING

(75) Inventors: Paul C. Hershey, Ashburn, VA (US);
Christopher J. Graham, Bethesda, MD (US); Leslie A. Ledda, Heath, TX (US); Christopher L. Kuhn, The Colony, TX (US); Mu-Cheng Wang, Acton, MA (US); Steve Davidson, Acton, MA (US); Carlton E. Nance, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 360 days.

(21) Appl. No.: 13/454,568

(22) Filed: Apr. 24, 2012

(65) Prior Publication Data
US 2013/0127633 A1     May 23, 2013

Related U.S. Application Data

(60) Provisional application No. 61/560,918, filed on Nov. 17, 2011, provisional application No. 61/615,702, filed on Mar. 26, 2012.

(51) Int. Cl.
    *G06K 9/00*     (2006.01)
    *G01S 7/00*     (2006.01)

(52) U.S. Cl.
    CPC .. *G06K 9/00* (2013.01); *G01S 7/003* (2013.01)

(58) Field of Classification Search
    USPC ........ 340/870.02; 348/143; 707/802; 702/13, 702/189; 382/100, 103, 107; 706/47
    See application file for complete search history.

(56) References Cited

U.S. PATENT DOCUMENTS

| | | | |
|---|---|---|---|
| 6,347,762 B1 | 2/2002 | Sims et al. | |
| 7,873,673 B2 | 1/2011 | Cleveland et al. | |
| 8,325,228 B2 * | 12/2012 | Mariadoss | 348/143 |
| 2004/0006424 A1 | 1/2004 | Joyce et al. | |
| 2004/0010374 A1 | 1/2004 | Raghuraman et al. | |
| 2005/0246304 A1 | 11/2005 | Knight et al. | |
| 2008/0005287 A1 | 1/2008 | Harvey et al. | |
| 2008/0259919 A1 | 10/2008 | Monga | |
| 2010/0150403 A1 * | 6/2010 | Cavallaro et al. | 382/107 |
| 2011/0205103 A1 * | 8/2011 | Nohara et al. | 342/90 |
| 2013/0128041 A1 * | 5/2013 | Hershey et al. | 348/143 |
| 2014/0185877 A1 * | 7/2014 | Suzuki et al. | 382/103 |

OTHER PUBLICATIONS

O'Kane et al., "An Account of Object Identification Confusions" Journal of Experimental Psychology: Applied 1997, vol. 3, No. 1, 21-41.
Collins et al., "A UAV Routing and Sensor Control Optimization Algorithm for Target Search" Proc of SPIE vol. 6561, 65610D, (2007).

* cited by examiner

*Primary Examiner* — Brent Swarthout
(74) *Attorney, Agent, or Firm* — Burns & Levinson LLP; Joseph M. Maraia

(57) ABSTRACT

The technology described herein includes a system and/or a method for policy-based data management. The method includes receiving, by a sensor platform device, sensor data from one or more sensors; selecting, by the sensor platform device, one or more screening policies from a plurality of screening policies based on one or more mission parameters and a platform type associated with the sensor platform device; generating, by the sensor platform device, a data set from the sensor data based on the selected one or more screening policies; and transmitting, by the sensor platform device, the data set to one or more computing devices.

16 Claims, 16 Drawing Sheets

POLICY BASED DATA MANAGEMENT AND IMAGING CHIPPING

RELATED APPLICATIONS

This application claims the benefit of U.S. Provisional Application No. 61/560,918, filed on Nov. 17, 2011 and U.S. Provisional Application No. 61/615,702, filed on Mar. 26, 2012. The entire teachings of the above applications are incorporated herein by reference.

BACKGROUND

Current sensor resources, such as land-based, sea-based, and airborne sensors resources, transmit sensor information back to analysts and/or computer system. Currently, service analysts who monitor intelligence feeds from sensor platforms watch mundane video footage for hours on end without ever seeing anything of value, a waste of both time and resources. Thus, a need exists in the art for improved sensor data management.

SUMMARY

One approach to sensor data management is a system for policy-based data management. The system includes one or more sensor platforms, each sensor platform of the one or more sensor platforms comprising: a receiver configured to receive sensor data from one or more sensors, a data screening policy module configured to select one or more screening policies from a plurality of screening policies based on one or more mission parameters and a platform type associated with the sensor platform, a data screening module configured to generate a data set from the sensor data based on the selected one or more screening policies, and a transmitter configured to transmit the data set to one or more computing devices.

Another approach to sensor data management is a method for policy-based data management. The method includes receiving, by a sensor platform device, sensor data from one or more sensors; selecting, by the sensor platform device, one or more screening policies from a plurality of screening policies based on one or more mission parameters and a platform type associated with the sensor platform device; generating, by the sensor platform device, a data set from the sensor data based on the selected one or more screening policies; and transmitting, by the sensor platform device, the data set to one or more computing devices.

Another approach to sensor data management is a computer program product that is tangibly embodied in an information carrier. The computer program product includes instructions being operable to cause a data processing apparatus to: receive sensor data from one or more sensors; select one or more screening policies from a plurality of screening policies based on one or more mission parameters and a platform type associated with the sensor platform device; generate a data set from the sensor data based on the selected one or more screening policies; and transmit the data set to one or more computing devices.

Another approach to sensor data management is a system for data tasking and visualization. The system includes a computing device including: a screening module configured to receive a screening policy selection from a user associated with the computing device, the screening policy selection being selected from a plurality of screening policies and each of the plurality of screening policies being indicative of a mission event, a transmitter configured to transmit the screening policy selection to one or more sensor platforms, a receiver configured to receive one or more data sets from the one or more sensor platforms in response to the transmission of the screening policy selection, and a display device configured to display the one or more data sets to the user.

Another approach to sensor data management is a method for data tasking and visualization of data. The method includes receiving, by a computing device, a screening policy selection from a user associated with the computing device, the screening policy selection being selected from a plurality of screening policies and each of the plurality of screening policies being indicative of a mission event; transmitting, by the computing device, the screening policy selection to one or more sensor platform devices; receiving, by the computing device, one or more data sets from the one or more sensor platform devices in response to the transmission of the screening policy selection; and displaying, by the computing device, the one or more data sets to the user.

Another approach to sensor data management is a computer program product. The computer program product is tangibly embodied in an information carrier. The computer program product includes instructions being operable to cause a data processing apparatus to: receive a screening policy selection from a user associated with the computing device, the screening policy selection being selected from a plurality of screening policies and each of the plurality of screening policies being indicative of a mission event; transmit the screening policy selection to one or more sensor platform devices; receive one or more data sets from the one or more sensor platform devices in response to the transmission of the screening policy selection; and display the one or more data sets to the user.

In other examples, any of the approaches above can include one or more of the following features.

In some examples, the system further includes the one or more computing devices, each computing device of the one or more computing devices includes: a receiver configured to receive a data set from at least one of the one or more of the sensor platforms, a display device configured to display the received data set, a mission parameter module configured to generate one or more modified mission parameters based on input from a user associated with the computing device, and a transmitter configured to transmit the one or more modified mission parameters to at least one of the one or more of the sensor platforms.

In other examples, each of the one or more sensor platforms further includes: the receiver further configured to receive second sensor data from one or more sensors, the data screening policy module further configured to select a second set of one or more screening policies from the plurality of screening policies based on the one or more modified mission parameters and the platform type associated with the sensor platform, the data screening module further configured to generate a second data set from the second sensor data based on the selected second set of one or more screening policies, and the transmitter further configured to transmit the second data set to the one or more computing devices.

In some examples, the sensor data includes image data, video data, audio data, or any combination thereof; and each of the one or more sensor platforms further includes: a data link module configured to determine a data link parameter associated with a data link between the respective sensor platform and at least one of the one or more computing devices; and a multimedia chipping module configured to generate one or more image chips from the sensor data based on the data link parameter and one or more image parameters, the one or image parameters are received from one or more users associated with the at least one of the one or more computing device.

In other examples, the one or image parameters include an image chipping technique, a user preference, a user selected focus area, or any combination thereof.

In some examples, each of the one or more sensor platforms further includes: a data link module configured to determine a data link parameter associated with a data link between the respective sensor platform and at least one of the one or more computing devices; and a data reduction module configured to dynamically reduce the data set before transmission by the transmitter based on the data link parameter and the one or more mission parameters.

In other examples, the one or more mission parameters include a real-time mission event, a planned mission event, a user preference, a data type associated with the sensor data, or any combination thereof.

In some examples, the plurality of screening policies includes a model-based policy, a statistics-based policy, a learning-based policy, a event-driven policy, or any combination thereof.

In other examples, each of the sensor platforms comprises the one or more sensors.

In some examples, the method further includes receiving, by a computing device, data sets from a plurality of sensor platform devices; generating, by the computing device, one or more modified mission parameters based on input from a user associated with the computing device; and transmitting, by the computing device, the one or more modified mission parameters to one or more of sensor platform devices.

In other examples, the method further includes receiving, by the sensor platform device, the one or more modified mission parameters; selecting, by the sensor platform device, one or more second screening policies from the plurality of screening policies based on the one or more modified mission parameters and the platform type associated with the sensor platform device; generating, by the sensor platform device, a second data set from the sensor data based on the selected one or more second screening policies; and transmitting, by the sensor platform device, the second data set to the computing device.

In some examples, the method further includes receiving, by the sensor platform device, the one or more modified mission parameters; receiving, by the sensor platform device, second sensor data from the one or more sensors; selecting, by the sensor platform device, one or more second screening policies from the plurality of screening policies based on the one or more modified mission parameters and the platform type associated with the sensor platform device; generating, by the sensor platform device, a second data set from the second sensor data based on the selected one or more second screening policies; and transmitting, by the sensor platform device, the second data set to the computing device.

In other examples, the method further includes determining, by the sensor platform device, a data link parameter associated with a data link between the sensor platform device and at least one of the one or more computing devices; generating, by the sensor platform device, one or more image chips from the sensor data based on the data link parameter and one or more image parameters, the one or image parameters are received from one or more users associated with the at least one of the one or more computing devices and the sensor data comprises image data, video data, audio data, or any combination thereof; and transmitting, by the sensor platform device, the one or more image chips to the least one of the one or more computing devices.

In some examples, the method further includes determining, by the sensor platform device, a data link parameter associated with a data link between the respective sensor platform and the one or more computing devices; and dynamically reducing, by the sensor platform device, the data set before transmitting based on the data link parameter and the one or more mission parameters, the dynamic reduction of the data set comprises a compression technique, a data correlation technique, or any combination thereof.

In other examples, the one or more mission parameters are pre-determined based on a planned mission associated with the sensor platform device.

In some examples, the method further includes dynamically generating, by the sensor platform device, the one or more mission parameters based on one or more real-time mission events.

In other examples, the computing device further includes: a identification module configured to associate one or more annotations received from the user with the one or more data sets, and the transmitter configured to transmit the one or more annotations to a screening policy server.

In some examples, the system further includes the one or more sensor platforms, each sensor platform of the one or more sensor platforms includes: a receiver configured to: receive the screening policy selection from the computing device, and receive sensor data from one or more sensors, a data screening module configured to generate a data set from the sensor data based on the screening policy selection, and a transmitter configured to transmit the data set to the computing device.

In other examples, each of the one or more sensor platforms further includes: a multimedia pattern matching module configured to identify one or more mission-relevant objects in the sensor data based on the screening policy selection, the sensor data comprises image data, video data, or any combination thereof, a multimedia tagging module configured to associate one or more data tags with the sensor data associated with the identified one or more mission-relevant objects based on the mission event, and the transmitter further configured to transmit the sensor data associated with the identified one or more mission-relevant objects and the associated one or more data tags to the computing device.

In some examples, the system further includes a screening policy server including: a receiver configured to: receive sensor data and data sets from the one or more sensor platforms, and receive screening policy selections from a plurality of computing devices, a data repository module configured to store the sensor data, the data sets, and the screening policy selections, and a screening policy generation module configured to generate the plurality of screening policies based on the stored sensor data, the stored data sets, and the stored screening policy selections.

In other examples, the system further includes the screening policy generation module of the screening policy server further configured to modify at least one of the plurality of screening policies based on the stored sensor data, the stored data sets, and the stored screening policy selections.

In some examples, the screening module of the computing device further configured to determine a set of screening policies from the plurality of screening policies based on one or more mission parameters.

In other examples, the one or more mission parameters includes a real-time mission event, a planned mission event, a user preference, a data type associated with the sensor data, or any combination thereof.

In some examples, the plurality of screening policies includes a model-based policy, a statistics-based policy, a learning-based policy, a event-driven policy, or any combination thereof.

In other examples, the computing device is a mobile computing device.

In some examples, the method further includes associating, by the computing device, one or more annotations received from the user with the one or more data sets; and transmitting, by the computing device, the one or more annotations to a screening policy server.

In other examples, the method further includes receiving, by a sensor platform device of the one or more sensor platform devices, the screening policy selection from the computing device; receiving, by the sensor platform device, sensor data from one or more sensors, generating, by the sensor platform device, a data set from the sensor data based on the screening policy selection; and transmitting, by the sensor platform device, the data set to the computing device.

In some examples, the method further includes identifying, by the sensor platform device, one or more mission-relevant objects in the sensor data based on the screening policy selection, the sensor data comprises image data, video data, or any combination thereof; associating, by the sensor platform device, one or more data tags with the sensor data associated with the identified one or more mission-relevant objects based on the mission event; and transmitting, by the sensor platform device, the sensor data associated with the identified one or more mission-relevant objects and the associated one or more data tags to the computing device.

In other examples, the method further includes determining, by the computing device, a set of screening policies from the plurality of screening policies based on one or more mission parameters.

In some examples, the method further includes the one or more mission parameters include a real-time mission event, a planned mission event, a user preference, a data type associated with the sensor data, or any combination thereof.

The sensor data management techniques described herein can provide one or more of the following advantages. An advantage to the technology is that each sensor platform can transmit only that information relevant to the respective mission of the computing device so that corresponding user assigned to the mission can receive a reduced set of information resulting in reduced overall system bandwidth and processing requirements. Another advantage of the technology is that the reduction of data enables the user to respond to mission events of interest, thereby decreasing processing time and increasing data throughput. Another advantage of the technology is that the automated, real-time data reduction based on the mission parameters reduces data overload from intelligence, surveillance, and reconnaissance assets and reduces the users' inability to review the data due to the data overload.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
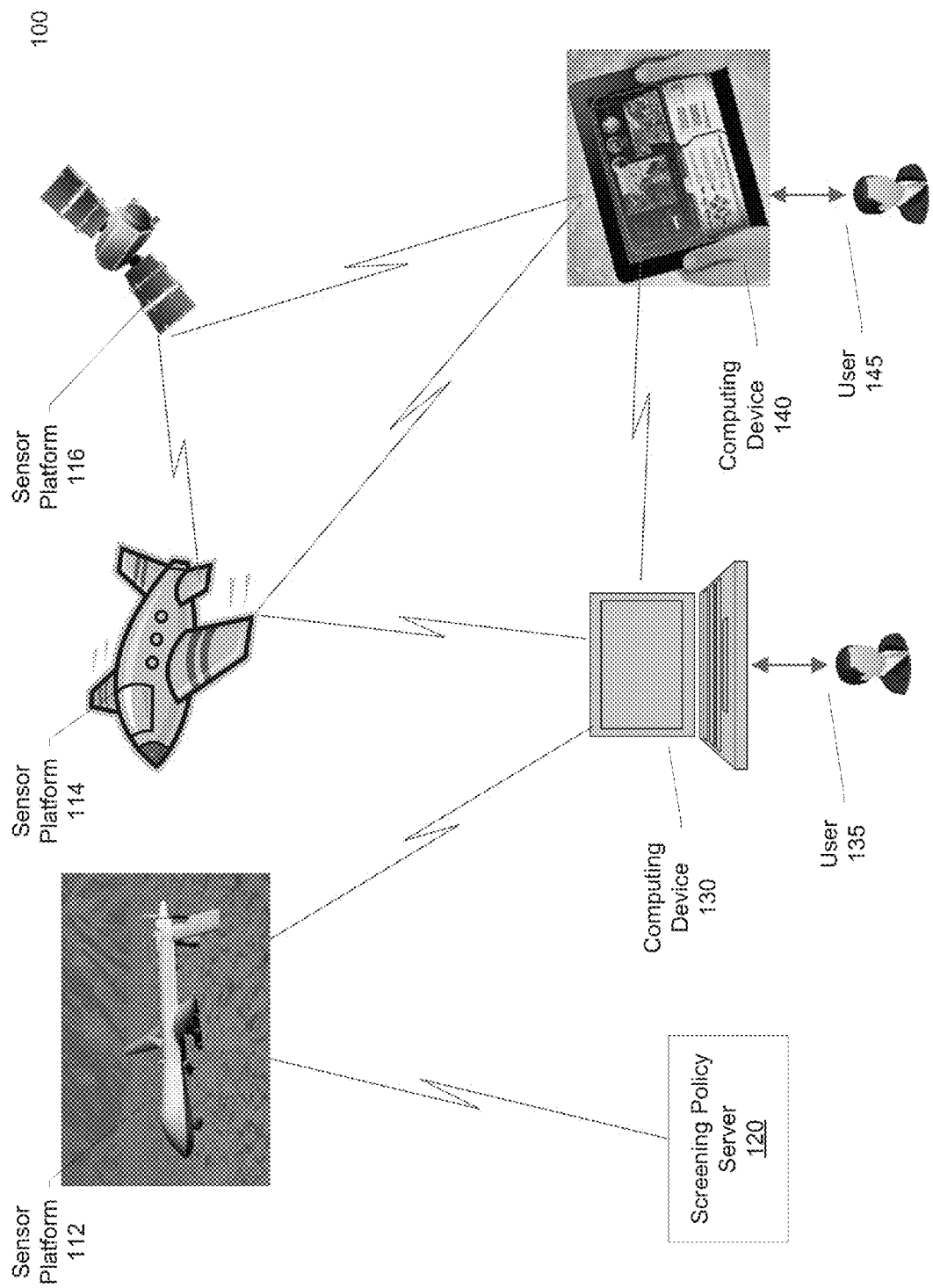
FIG. 1 illustrates an exemplary block diagram of a data management environment.

The sensor data management includes a multi-factor information engine (MIE) that, generally, provides processing of sensor data on sensor platforms and/or computing devices. The technology can automatically select screening algorithms and/or compression algorithms based on the mission plan (e.g., desert environment, water environment, etc.) and events that occur during the mission (e.g., different types of targets, new environmental information, etc.). The on-sensor platform data screening can greatly improve operations center and analyst productivity by identifying areas of interest in big data sets, thereby decreasing the processing time and effort to identify and/or track a target. For example, in operation, the technology enables a plurality of sensor platforms to dynamically and in real-time screen and/or compress sensor data for transmission The screening algorithms can include one or more tunable parameters/sensitivities: nominal parameters derived based on essential elements of information (EEI), data type, analyst/user preferences, and dynamic/adaptive parameters for the increase of the tactical relevance of the data. The technology can include multiple sets (e.g., catalogues) of screening algorithm configuration files on-board the sensor platform. The sets can includes tasking assignments for the sensor chosen based on the mission plan (e.g., water environment to identify fast moving boats, urban environment to identify cargo vans, etc.) and the most likely mission events to occur during that specific mission (e.g., cargo vans near a shipping facility, movement of the camera, etc.). The technology can automatically switch between configuration files (also referred to as screening policies) based on mission events. For example, if occupants of a boat move to a truck, the technology can dynamically and automatically switch from a boat screening policy to a truck screening policy. The technology can provide secondary screening algorithm catalogues, the number of which can depend on the storage capacity of the platform. The subsequent catalogues can, for example, accommodate unplanned mission events, thereby providing flexibility in the sensor data being communicated to the computing devices.

If the mission completely changes so that unexpected information is now required, then new catalogues (also referred to as screening policies) can be installed from the operations and analysts centers and/or from the tactical end-users. In other words, new screening policies can be transmitted to the sensor platforms in real-time based on changing environments (e.g., automatically based on location, automatically based on sensor data, in response to a user request, etc.). This adaptive changing of screening policies can enable sensor tasking directly from the tactical end-user, which advantageously increases the chance for detection of a target by the end-user and decreases the time to organize and/or sort through the data. The end-users have the ability to change the tasking of the sensor through the tasking/screening manager at the ground segment, thereby decreasing the network link bandwidth to the end-user and decreasing the processing and storage needed at the end-user's computing device.

FIG. 1 illustrates an exemplary block diagram of a data management environment 100. The environment 100 includes sensor platforms 112, 114, and 116, a screening policy server 120, and computing devices 130 and 140. Users 135 and 145 interact with the computing device 130 and 140, respectively, to view and/or request sensor data. The screening policy server 120 transmits screening policies to the sensor platforms 112, 114, and 116 (e.g., on demand, based on updates, etc.).

For example, in operation, the sensor platforms 112, 114, and 116 are deployed to a desert environment for detection of trucks in the desert (e.g., border crossing mission, truck tracking mission, etc.). Each of the sensor platforms 112, 114, and 116 include one or more sensors (e.g., video camera, radar, etc.). The one or more sensors on each of the sensor platforms 112, 114, and 116 receive sensor data from target objects.

Each of the sensor platforms 112, 114, and 116 selects one or more screening policies based on the mission parameters (e.g., desert, night, etc.) and/or the platform type (e.g., aircraft, satellite, etc.). Each of the sensor platforms 112, 114, and 116 generates a data set from the sensor data based on the selected one or more screening policies and transmits the data set to the computing devices 130 and 150. The users 135 and 145 of the computing devices 130 and 150, respectively, can view and/or modify the data set.

Table 1 illustrates exemplary sensor data, screening policy, and data set. As illustrated in Table 1, the screening policy on the sensor platform reduces the data sent to the computing devices 130 and 140 (i.e., the data set), thereby reducing the transmission bandwidth between the sensor platform and the computing device and reducing the data for review by the user 135 and 140, respectively.

TABLE 1

Exemplary Sensor Data, Screening Policy, and Data Set

| Sensor Platform | Sensor Data | Screening Policy | Data Set Destination | Data Set |
|---|---|---|---|---|
| Sensor Platform 112 | Parts A, B, C, D, E, F, G, H | Desert Environment; Truck Target Objects | Computing Device 130 | Parts B, D, F |
| Sensor Platform 114 | Parts L3, L4, L5, L6 ... L99 | Truck Target Objects | Computing Device 130 | Parts L4, L28, L56 |
| | | Desert Environment | Computing Device 140 | Parts L6, L9, L10 |
| Sensor Platform 116 | Parts Z4, Z9, Z13, Z45, Z56, Z98 | Fast Moving Objects | Computing Device 130 | Parts Z9, Z98 |
| | | Slow Moving Objects | Computing Device | Parts Z45 |

Table 2 illustrates exemplary screening policy selection. As illustrated in Table 2, each sensor platform can select a screening policy based on the sensor platform type, the available screening policies (e.g., available from a remote server, available in local memory, etc.), and a selection from the computing device (e.g., the user selects a desert screening policy, the user selects a boat screening policy, etc.).

TABLE 2

Exemplary Screening Policy Selection

| Sensor Platform | Sensor Platform Type | Available Screening Policies | Screening Policy Selection From Computing Device | Selected Screening Policy |
|---|---|---|---|---|
| Sensor Platform 114 | Aircraft | Low Altitude Desert; Medium Altitude Desert; High Altitude Desert ... | Desert | Medium Altitude Desert |
| Sensor Platform 114 | Aircraft with Video Camera | Desert with Thermal Imaging; Desert with Video Imaging; Desert with Black/White Imaging | Black/White Imaging | Desert with Black/White Imaging |
| Sensor Platform 116 | Satellite with Optical Lenses | Low Altitude Desert; Medium Altitude Desert; High Altitude Desert ... | Desert | High Altitude Desert |
| Sensor Platform 112 | Unmanned Aerial Vehicle | Low Velocity Desert; Medium Velocity Desert; High Velocity Desert ... | Desert | Low Velocity Desert |

In some examples, each of the sensor platforms 112, 114, and 116 selects different screening policies and/or generates different data sets from the sensor data based on the different screening policies. In other examples, each of the sensor platforms 112, 114, and 116 selects the same screening policies and generates different data sets from the sensor data based on the same screening policies but different sensor data (e.g., video sensor data, radar sensor data, etc.).

Although FIG. 1 illustrates three sensor platforms 112, 114, and 116, the technology can utilize any number and/or types of sensor platforms. For example, the technology can utilize one hundred sensor platforms. Although FIG. 1 illustrates two computing devices 130 and 140, the technology can utilize any number and/or types of computing devices.

For example, the three sensor platforms 112, 114, and 116 can transmit sensor data and/or receive screening policy requests from four hundred different computing devices. Although FIG. 1 illustrates the sensor platforms 112, 114, and 116 as devices in the air and/or space, the sensor platforms can be any type of sensor device and/or in any location (e.g., a video camera on a mobile handheld device, a land-mounted video camera, an audio sensor on a vehicle, etc.). In others, the technology can utilize sensor data from any type of sensor located in any location (e.g., ground, air, space, water, etc.).

In other words, the technology enables the sensor platforms to do some of the analysis before transmitting the data to the operations and/or analyst centers (e.g., the computing devices at these locations), thereby saving analysis time and computer resources (e.g., network bandwidth, processing time, etc.). In some examples, the technology sends back only the important information for human viewing, thereby reducing end-user time on data analysis. In other examples, extraneous data can be available for viewing at a later time, if needed, for example if the analyst computer made a mistake. The technology is more responsive to a greater range of threats or opportunities across the spectrum due to the ability to scale down the data being sent to an end-user while also saving all of the data for later viewing by the end-user.

In some examples, the technology can provide accelerated and improved information feeds by processing data at earliest possible point for intelligence, surveillance, and reconnaissance processing, exploitation, and dissemination (ISR PED) through screening policies and/or automatic in-line processing. The technology can provide definition of the events and can initiate automated swapping of screening policies on the sensor platform based on mission conditions and/or mission parameters.

The technology can provide air to ground transmission of the output from the sensor platform into the downlink pathway (i.e., to one or more computing devices). The technology can match appropriate or more likely screening policies with mission plans (e.g., water environment, city environment, etc.), objectives (e.g., detection of people, detection of ships, etc.), and/or typical mission scenarios (e.g., crowded city, empty farmland, etc.). The technology can provide direct user control and extraction for relevant intelligence, surveillance, and reconnaissance (ISR) information and can support mission needs through dynamic re-tasking of the sensor platforms and/or screening policies. The technology can be used for any type and/or number of plans, objectives, and/or scenarios (e.g., manned and unmanned; air, water and land platforms that are sending ISR data over communication links to various operation centers, etc.).

Figure 2:
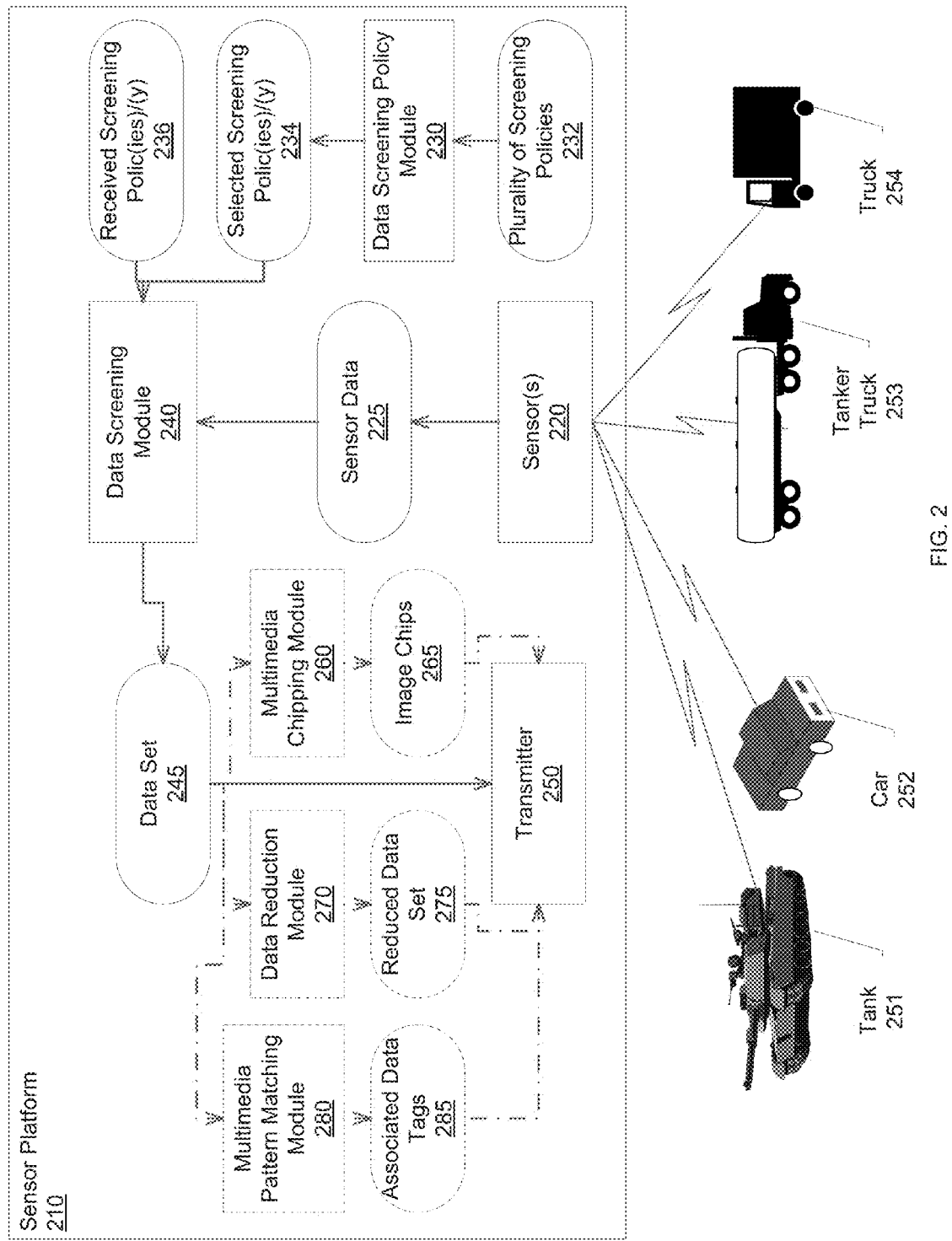
FIG. 2 is a flow diagram of an exemplary sensor platform in a policy-based data management system.

FIG. 2 is a flow diagram of an exemplary sensor platform 210 in a policy-based data management system (not shown). The sensor platform 210 includes one or more sensors 220 and/or a receiver (not shown). The sensor platform 210 further includes a data screening policy module 230, a data screening module 240, a transmitter, a multimedia chipping module 260, a data reduction module 270, and a multimedia pattern matching module 280. The multimedia chipping module 260, the data reduction module 270, and/or the multimedia pattern matching module 280 are optional components of the sensor platform 210. The sensor platform receives sensor data 225 about one or more target objects, in this example, a tank 251, a car 252, a tanker truck 253, and a truck 254.

The sensors 220 and/or the receiver receive sensor data 225. The sensor data 225 can include video data, radar data, and/or any other type of sensor data. The data screening policy module 230 selects one or more screening policies 234 from a plurality of screening policies 232 based on one or more mission parameters (e.g., water mission, desert mission, truck detection mission, etc.) and a platform type (e.g., satellite, aircraft, video camera, radar, etc.) associated with the sensor platform.

The data screening module 240 generate a data set 245 from the sensor data 225 based on the selected one or more screening policies 234 and/or one or more received screening policies 236. The data screening module 240 can receive the one or more received screening policies 236 from another system and/or user. The transmitter 250 transmits the data set 245 to one or more computing devices (not shown).

In some examples, the sensors 220 and/or the receiver receive second sensor data (not shown). The second sensor data can include video data, radar data, and/or any other type of sensor data. The data screening policy module 230 selects one or more second screening policies (not shown) from the plurality of screening policies 232 based on one or more modified mission parameters (e.g., water mission, desert mission, truck detection mission, etc.) and a platform type (e.g., satellite, aircraft, video camera, radar, etc.) associated with the sensor platform. The data screening module 240 generate a second data set (not shown) from the second sensor data based on the selected one or more screening policies 234 and/or one or more received screening policies 236. The transmitter 250 transmits the second data set to one or more computing devices (not shown).

Table 3 illustrates modified mission parameters and the resulting data set. As illustrated in Table 3, the sensor platform can select a new screening policy based on modifications to the mission parameters and transmit a new data set (e.g., additional data, revised data, etc.) to the computing device for review by the user. The modification and new data set process advantageously enables the user to change the viewable data in real-time to increase efficiency and reduce time spend reviewing data. The mission parameter selection enables the users to fine-tune the sensor data (e.g., boat size, relationships, behaviors, events, etc.) to identify and track target objects, thereby increasing the user's efficiency and decreasing the processing time for the computing device.

TABLE 3

Exemplary Modified Mission Parameters

| Sensor Platform | Initial Screening Policy | Initial Data Set | Modified Mission Parameters | Revised Screening Policy | Revised Data Set |
| --- | --- | --- | --- | --- | --- |
| Sensor Platform 114 | Fast Moving Boat in Water | Data Parts AZ, BD, LM | Reduce Speed of Boats | Slow Moving Boat in Water | Data Parts HG, PN, JM |
| Sensor Platform 116 | Slow Moving Boat in Water | Data Parts JK, L4, L8 | Move to Coastal Area | Slow Moving Boat Close to Land in Water & | Data Parts JK, L4, L8, U8, U3 |

TABLE 3-continued

Exemplary Modified Mission Parameters

| Sensor Platform | Initial Screening Policy | Initial Data Set | Modified Mission Parameters | Revised Screening Policy | Revised Data Set |
| --- | --- | --- | --- | --- | --- |
| Sensor Platform 116 | Trucks in Urban Landscape & Tanks in Urban Landscape | Data Parts U8, U9, U10 | Increase Truck Size | Slow Moving Boat in Water Trucks in Urban Landscape & Tanks in Urban Landscape & Trains in Urban Landscape | Data Parts U8, U9, U10, U12, U56 |

In other examples, the sensor data 225 includes image data, video data, and/or audio data. In some examples, a data link module (not shown) determines a data link parameter (e.g., low bandwidth, high bandwidth, etc.) associated with a data link between the respective sensor platform and at least one of the one or more computing devices.

In other examples, the multimedia chipping module 260 generates one or more image chips from the sensor data based on the data link parameter and one or more image parameters. The one or image parameters can be received from one or more users associated with at least one of the one or more computing devices. In some examples, the one or image parameters comprise an image chipping technique, a user preference, and/or a user selected focus area.

In other examples, the data reduction module 270 dynamically reduces the data set before transmission by the transmitter to form a reduced data set 275 based on the data link parameter and the one or more mission parameters.

In some examples, the multimedia pattern matching module 280 identifies one or more mission-relevant objects in the sensor data based on the screening policy selection. In other examples, the sensor data includes image data and/or video data. The multimedia tagging module (not shown) associates one or more data tags 285 (e.g., location, time, suspected target object type, etc.) with the sensor data associated with the identified one or more mission-relevant objects based on the mission event. The transmitter 250 transmits the data tags 285 associated with the identified one or more mission-relevant objects and the associated one or more data tags to the computing device.

In other examples, the one or more mission parameters include a real-time mission event (e.g., course variation, detection of a target object, etc.), a planned mission event (e.g., arrival at a waypoint, desert environment, etc.), a user preference (e.g., no low resolution images, thermal images only, etc.), and/or a data type associated with the sensor data (e.g., video, images, audio, etc.). In some examples, the plurality of screening policies 232 includes a model-based policy, a statistics-based policy, a learning-based policy, and/or a event-driven policy. The plurality of screening policies 232 can be pre-loaded onto the sensor platform 210 based on the expected mission and/or can be dynamically uploaded to the sensor platform 210 based on a changed mission. Each of the plurality of screening policies 232 can include image filters, compression techniques, image analysis techniques, computing device capabilities (e.g., screen resolution, bandwidth restrictions, etc.), and/or any other type of policy to reduce/change the sensor data.

Figure 3:
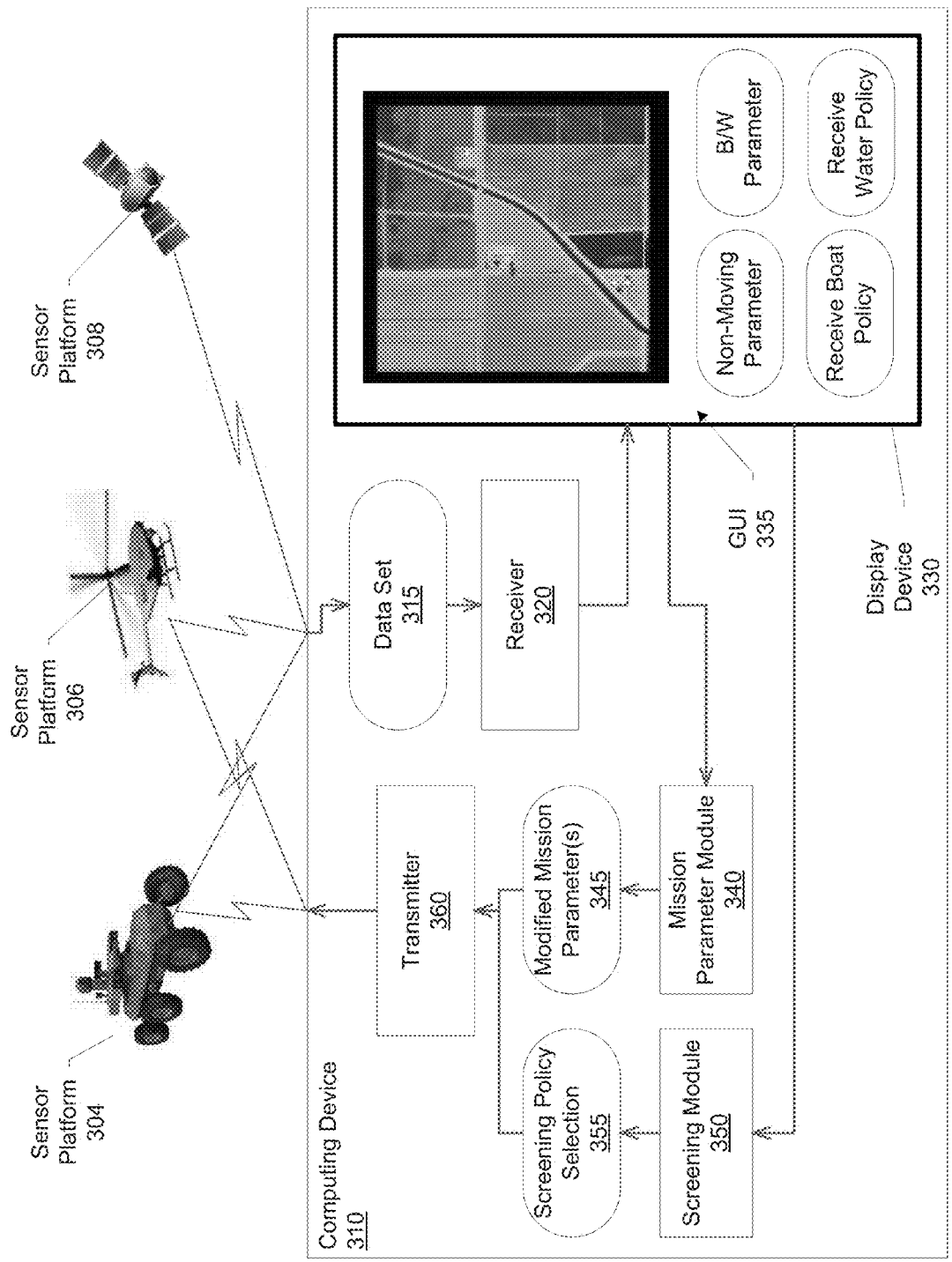
FIG. 3 is a flow diagram of an exemplary computing device in a data tasking and visualization system.

FIG. 3 is a flow diagram of an exemplary computing device 310 in a data tasking and visualization system (not shown). The computing device 310 includes a receiver 320, a display device 330, a mission parameter module 340, a screening module 350, and a transmitter 360. The screening module 350 receives a screening policy selection 355 from a user associated with the computing device. The screening policy selection 355 is selected from a plurality of screening policies and each of the plurality of screening policies is indicative of a mission event (e.g., detection of a target object, desert environment, water environment, boat detection mission, etc.). As illustrated in the GUI 335, the user can select one or more different policies (in this example, a receive boat policy and a receive water policy). The transmitter 360 transmits the screening policy selection 355 to one or more sensor platforms 304, 306, and/or 308.

The receiver 320 receives one or more data sets 315 from the one or more sensor platforms 304, 306, and/or 308 in response to the transmission of the screening policy selection. The display device 330 displays, via a graphical user interface (GUI) 335, the one or more data sets to the user.

The mission parameter module 340 generates one or more modified mission parameters 345 (e.g., new environment, new image resolution threshold, etc.) based on input from a user associated with the computing device. As illustrated in the GUI 335, the user can select one or more modified mission parameters (in this example, a non-moving parameter and a black/white parameter). The transmitter 360 transmits the one or more modified mission parameters 345 to at least one of the one or more of the sensor platforms 304, 306, and/or 308. The sensor platforms 304, 306, and/or 308 can utilize the one or more modified mission parameters 345.

In other examples, the computing device 310 includes a identification module (not shown) and the identification module associates one or more annotations received from the user with the one or more data sets. The transmitter 360 transmits the one or more annotations to a screening policy server (not shown) for storage with the associated data sets.

In some examples, the screening module 350 determines a set of screening policies from the plurality of screening policies based on one or more mission parameters. In other examples, the one or more mission parameters include a real-time mission event, a planned mission event, a user preference, and/or a data type associated with the sensor data. In some example, the plurality of screening policies includes a model-based policy, a statistics-based policy, a learning-based policy, and/or an event-driven policy. In other examples, the computing device is a mobile computing device.

Figure 4A:
FIGS. 4A-4E illustrate exemplary graphical user interfaces of the technology.

FIG. 4A illustrates an exemplary graphical user interface (GUI) 435a displayed on a display device 430a on a computing device 410a. The computing device 410a can access stored images and associated information (e.g., name, tags, etc.) from an image server for viewing. The image server can store the sensor data from the one or more sensor platforms for later viewing by a user associated with the computing device 410a. As illustrated in the GUI 435a, the user of the computing device 410a can show, edit, or destroy each of the images. Further, the user of the computing device 410a can view the tags of the image. The image interface into the image server advantageously enables users to access all of the available sensor data at a later time after the transmission of the reduced data set to the computing device of the user.

Figure 4B:
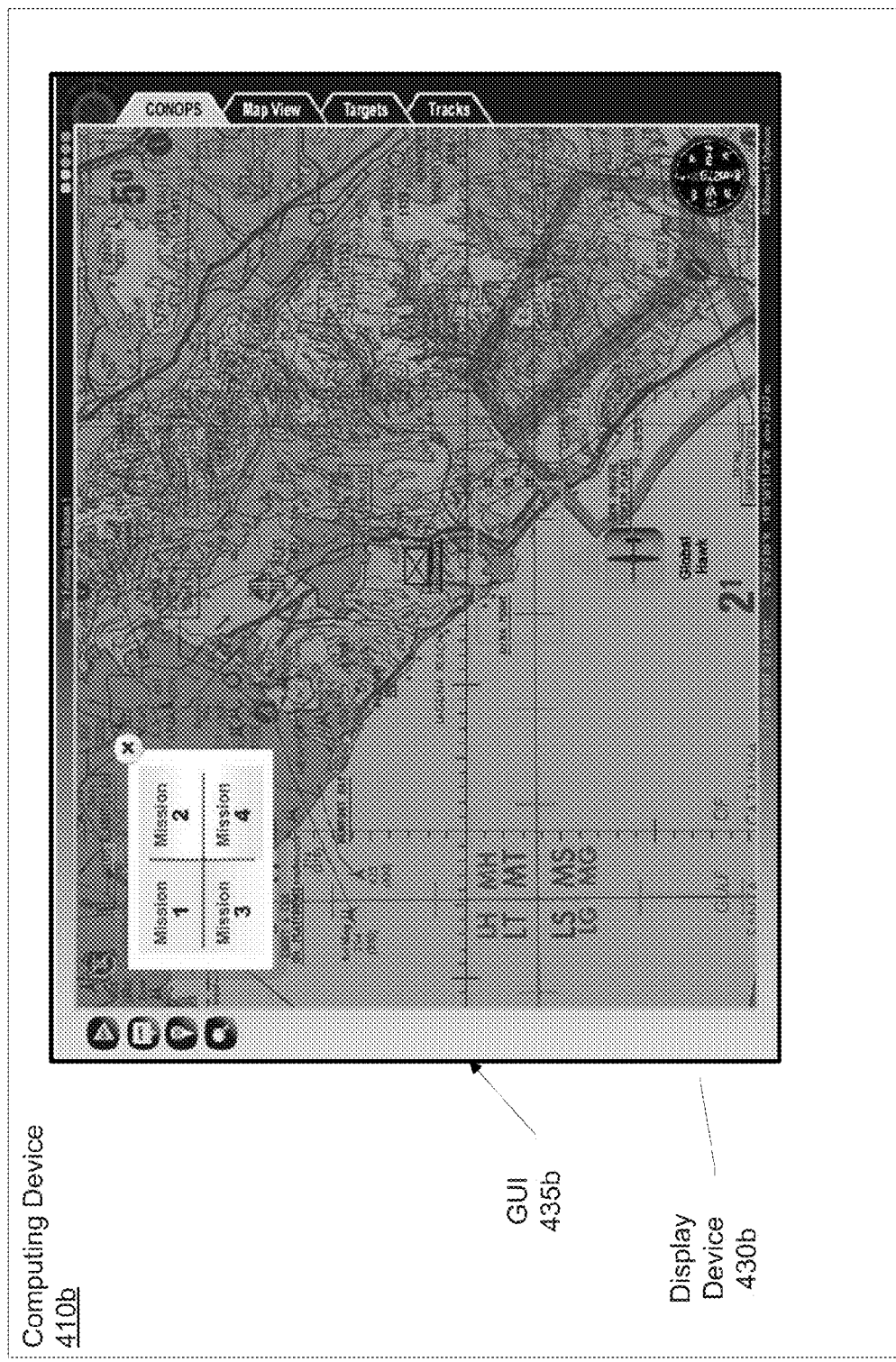

FIG. 4B illustrates an exemplary graphical user interface (GUI) 435b displayed on a display device 430b on a computing device 410b. The GUI 435b illustrates a data set from a sensor platform (in this example, a Global Hawk unmanned aerial vehicle). The user can select four different missions profiles (that is, mission 1, mission 2, mission 3, or mission 4) and the computing device 410b transmits the policy selection to the sensor platform. The sensor platform screens the sensor data based on the policy selection and transmits the screened data (also referred to as a data set) to the computing device 410b. The computing device 410b displays the screened data on the GUI 435b. For example, mission 1 is directed to the detection of boats in the water and mission 2 is directed to aircraft flying below one thousand feet.

Figure 4C:
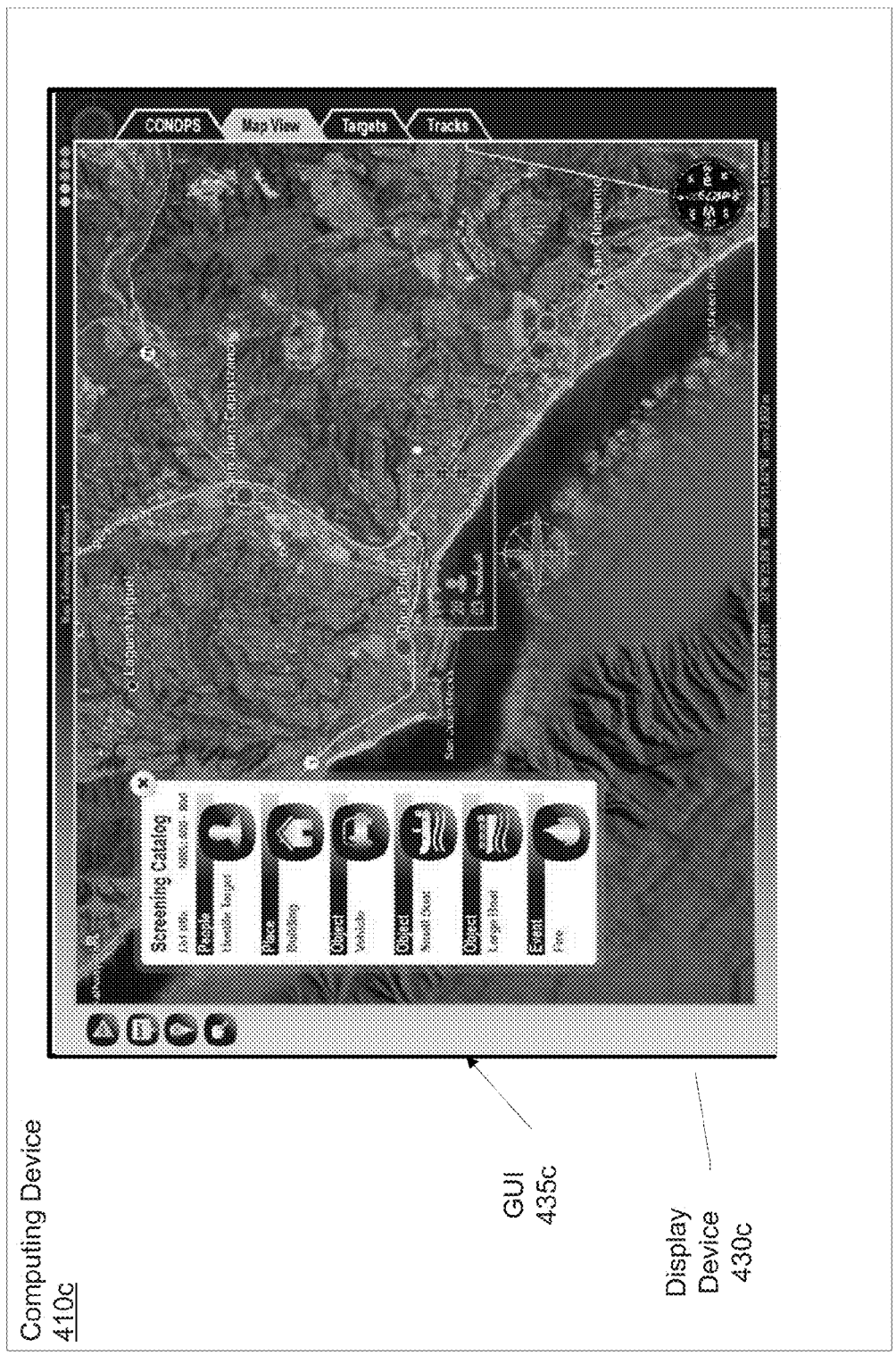

FIG. 4C illustrates an exemplary graphical user interface (GUI) 435c displayed on a display device 430c on a computing device 410c. The GUI 435c illustrates a data set from a sensor platform (in this example, an unmanned aerial vehicle). The user can select different mission parameters (also referred to a screening catalog) and the computing device 410b transmits the mission parameters to the sensor platform. The sensor platform screens the sensor data based on the mission parameters and transmits the screened data (also referred to as a data set) to the computing device 410c. The computing device 410c displays the screened data on the GUI 435c.

Figure 4D:

FIG. 4D illustrates an exemplary graphical user interface (GUI) 435d displayed on a display device 430d on a computing device 410d. The GUI 435d illustrates a data set from a sensor platform. The user can select different mission parameters (e.g., parameters within a small boat screening policy) and the computing device 410d transmits the mission parameters to the sensor platform. The sensor platform screens the sensor data based on the mission parameters and transmits the screened data (also referred to as a data set) to the computing device 410d. The computing device 410d displays the screened data on the GUI 435d.

Figure 4E:

FIG. 4E illustrates an exemplary graphical user interface (GUI) 435e displayed on a display device 430e on a computing device 410e. The GUI 435e illustrates a data set from a sensor platform (in this example, a Global Hawk unmanned aerial vehicle). As illustrated in the GUI 435e, the user can view behaviors, annotations about the image (e.g., who, what, when, where, why, etc.), object information, and/or other relevant information about the data set. In other words, the technology advantageously enables the annotation of sensor data and/or sharing of the annotations among the computing devices. To this end, a user utilizing a computing device can share annotations with other users via this process, thereby advantageously sharing intelligence information without overwhelming the other users.

Figure 5:
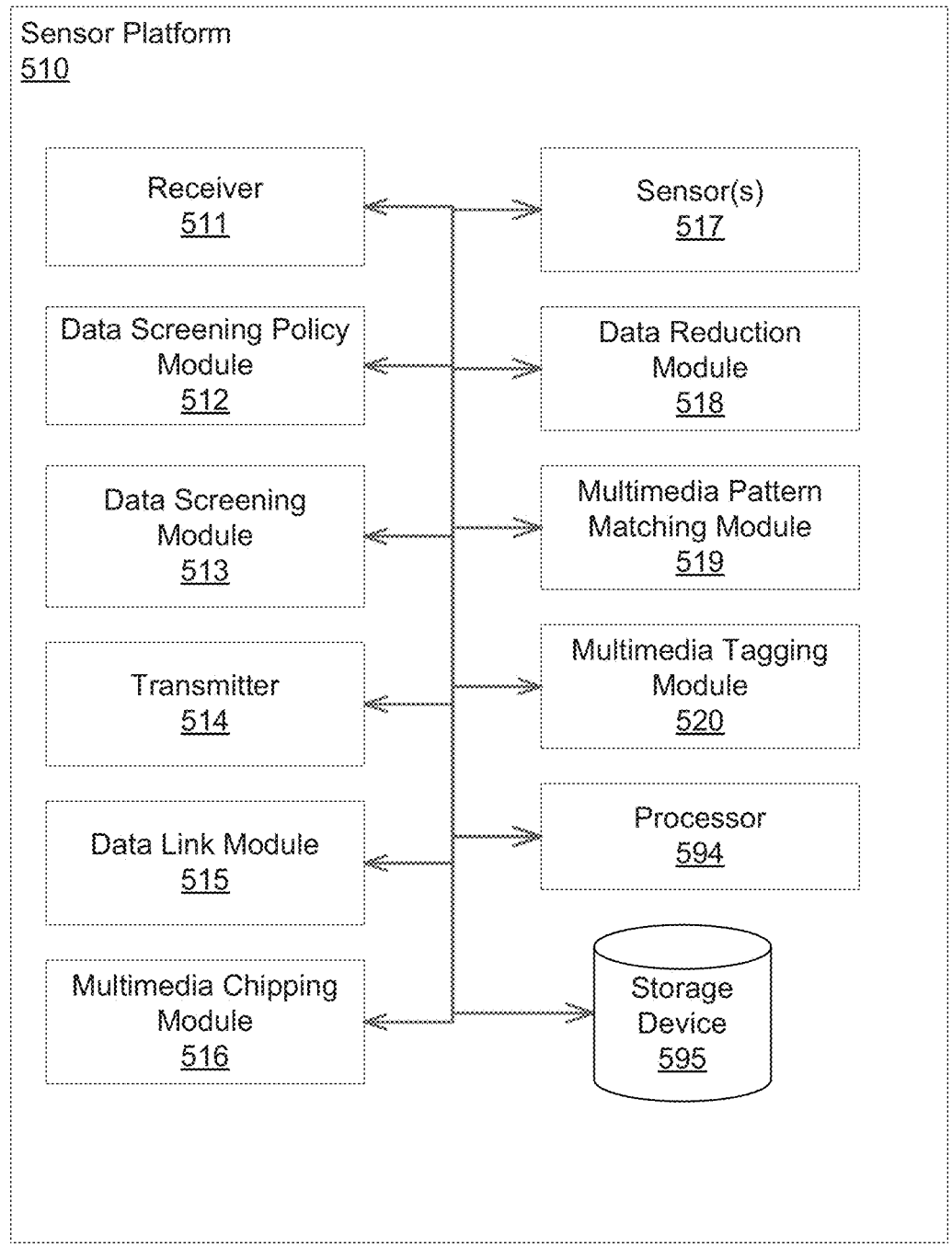
FIG. 5 is a block diagram of an exemplary sensor platform.

FIG. 5 is a block diagram of an exemplary sensor platform 510. The sensor platform 510 includes a receiver 511, a data screening policy module 512, a data screening module 513, a transmitter 514, a data link module 515, a multimedia chipping module 516, one or more sensors 517 (e.g., video camera, radar, audio, etc.), a data reduction module 518, a multimedia pattern matching module 519, a multimedia tagging module 520, a processor 594, and a storage device 595. The modules and devices described herein can, for example, utilize the processor 594 to execute computer executable instructions and/or include a processor to execute computer executable instructions (e.g., an encryption processing unit, a field programmable gate array processing unit, etc.). It should be understood that the sensor platform 510 can include, for example, other modules, devices, and/or processors known in the art and/or varieties of the illustrated modules, devices, and/or processors.

The sensors 517 and/or the receiver 511 receive sensor data. The data screening policy module 512 selects one or more screening policies from a plurality of screening policies based on one or more mission parameters (e.g., water mission, desert mission, truck detection mission, etc.) and a platform type (e.g., satellite, aircraft, video camera, radar, etc.) associated with the sensor platform 510.

The data screening module 513 generates a data set from the sensor data based on the selected one or more screening policies and/or one or more received screening policies. The data screening module 513 can receive the one or more received screening policies from another system and/or user. The transmitter 514 transmits the data set to one or more computing devices (not shown).

The data link module 515 determines a data link parameter associated with a data link between the sensor platform 510 and at least one of the one or more computing devices. The multimedia chipping module 516 generates one or more image chips from the sensor data based on the data link parameter and one or more image parameters. The data reduction module 518 dynamically reduces the data set before transmission by the transmitter to form a reduced data set based on the data link parameter and the one or more mission parameters.

The multimedia pattern matching module 519 identifies one or more mission-relevant objects (e.g., people, faces, men, women, mean with beards, men without beards, specific individuals, mountain backdrop, flat terrain backdrop, vehicles, weapons, roads, trails, power lines, landing strips, building, mobile antenna, etc.) in the sensor data based on the screening policy selection. The multimedia tagging module 520 associates one or more data tags (e.g., location, time, suspected target object type, etc.) with the sensor data associated with the identified one or more mission-relevant objects based on the mission event. The transmitter 514 transmits the data tags associated with the identified one or more mission-relevant objects and the associated one or more data tags to the computing device.

The processor 594 executes the operating system and/or any other computer executable instructions for the sensor platform 510 (e.g., executes applications, etc.). The storage device 595 stores the received data (e.g., actual sensor data, processed radar data, etc.), the identifications, and/or any other data associated with the sensor platform 510. The storage device 595 can store image information and/or any other data associated with the sensor platform 510. The storage device 595 can include a plurality of storage devices and/or the sensor platform 510 can include a plurality of storage devices (e.g., a radar storage device, an identification storage device, etc.). The storage device 595 can include, for example, long-term storage (e.g., a hard drive, a tape storage device, flash memory, etc.), short-term storage (e.g., a random access memory, a graphics memory, etc.), and/or any other type of computer readable storage.

Figure 6:
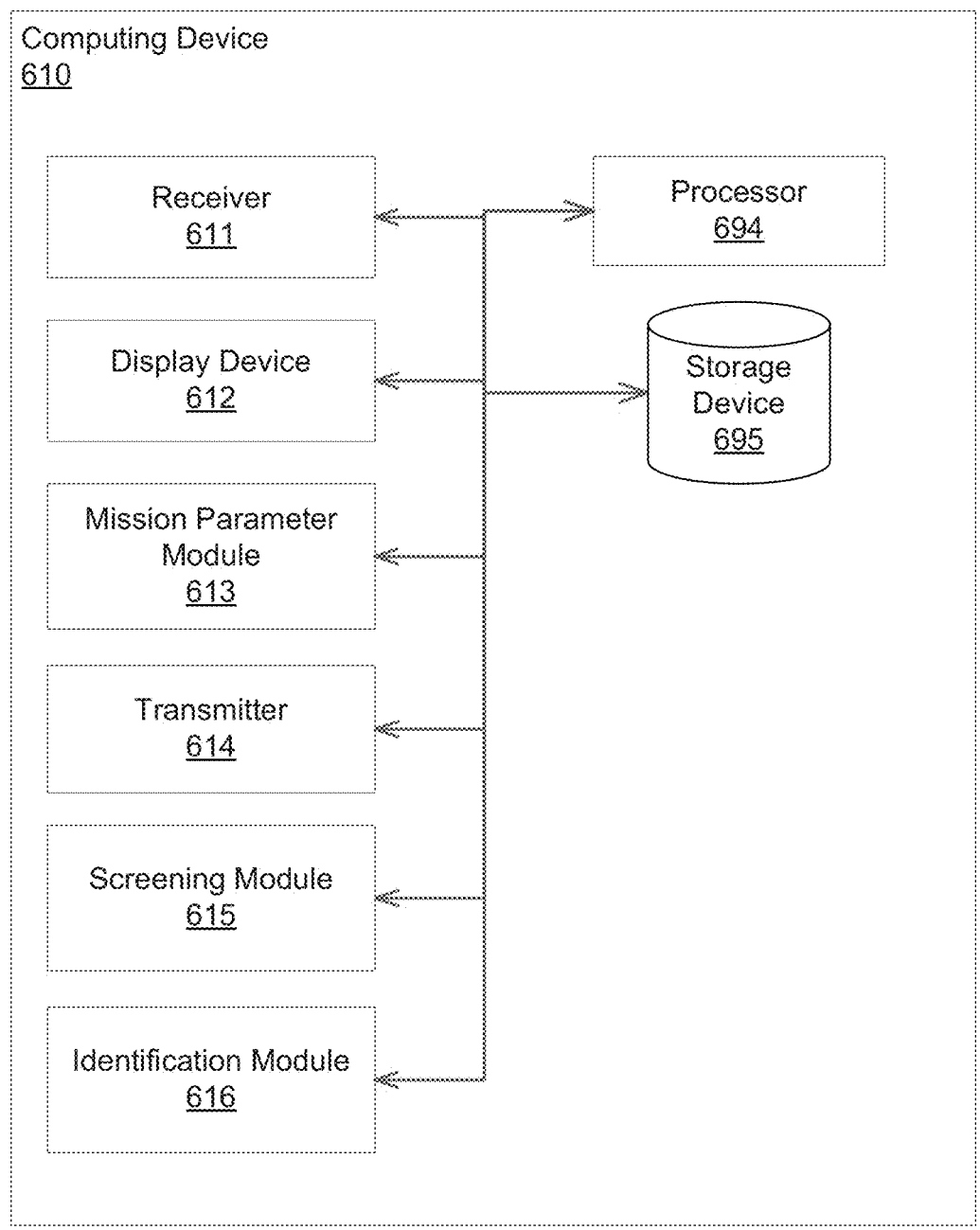
FIG. 6 is a block diagram of an exemplary sensor platform.

FIG. 6 is a block diagram of an exemplary computing device 610. The computing device 610 includes a receiver 611, a display device 612, a mission parameter module 613, a transmitter 614, a screening module 615, an identification module 616, a processor 694, and a storage device 695. The modules and devices described herein can, for example, utilize the processor 694 to execute computer executable instructions and/or include a processor to execute computer executable instructions (e.g., an encryption processing unit, a field programmable gate array processing unit, etc.). It should be understood that the computing device 610 can include, for example, other modules, devices, and/or processors known in the art and/or varieties of the illustrated modules, devices, and/or processors.

The receiver 611 receives one or more data sets from the one or more sensor platforms in response to the transmission of the screening policy selection. The display device 612 displays, via a graphical user interface (GUI), the one or more data sets to the user. The mission parameter module 613 generates one or more modified mission parameters (e.g., new environment, new image resolution threshold, etc.) based on input from a user associated with the computing device. The transmitter 614 transmits the one or more modified mission parameters to at least one of the one or more of the sensor platforms.

The screening module 615 determines a set of screening policies from the plurality of screening policies based on one or more mission parameters. The identification module 616 associates one or more annotations received from the user with the one or more data sets. The transmitter 614 transmits the one or more annotations to a screening policy server for storage with the associated data sets.

The processor 694 executes the operating system and/or any other computer executable instructions for the computing device 610 (e.g., executes applications, etc.). The storage device 695 stores the received data (e.g., actual sensor data, processed radar data, etc.), the identifications, and/or any other data associated with the computing device 610. The storage device 695 can store image information and/or any other data associated with the computing device 610. The storage device 695 can include a plurality of storage devices and/or the computing device 610 can include a plurality of storage devices (e.g., a radar storage device, an identification storage device, etc.). The storage device 695 can include, for example, long-term storage (e.g., a hard drive, a tape storage device, flash memory, etc.), short-term storage (e.g., a random access memory, a graphics memory, etc.), and/or any other type of computer readable storage.

Figure 7:
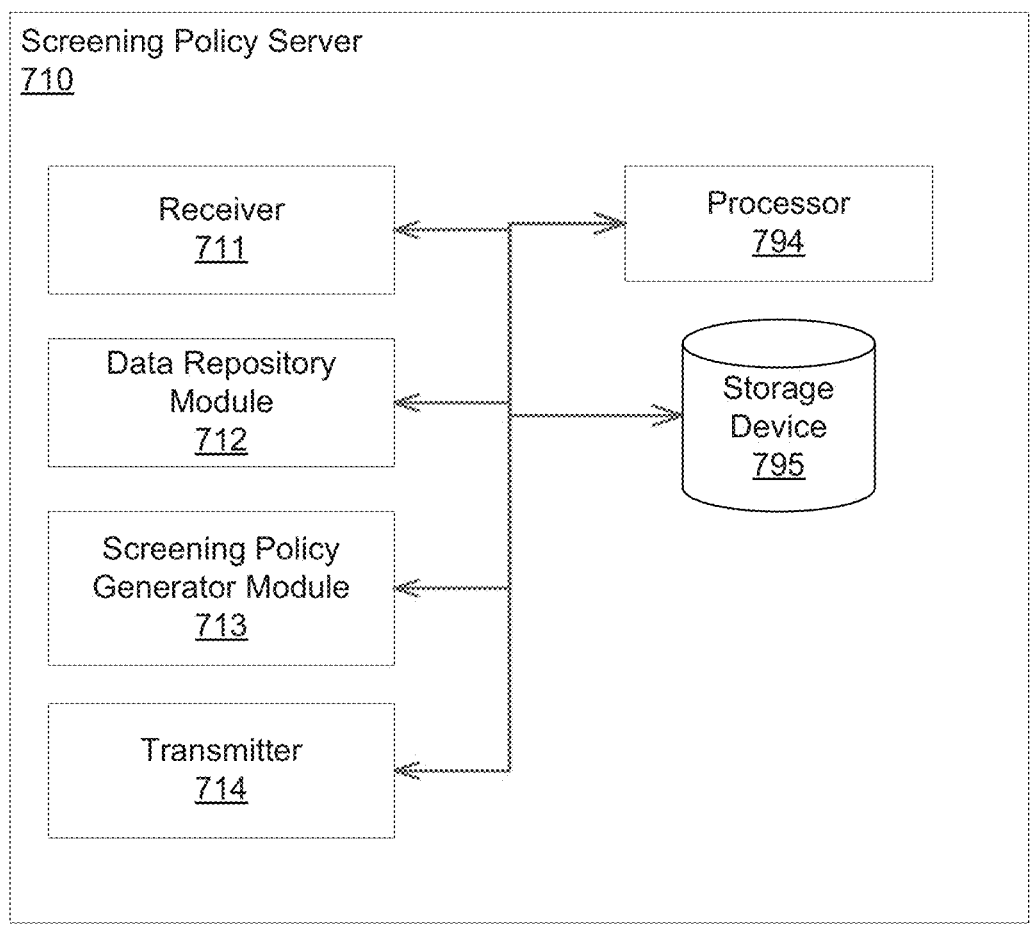
FIG. 7 is a block diagram of an exemplary screening policy server.

FIG. 7 is a block diagram of an exemplary screening policy server 710. The screening policy server 710 includes a receiver 711, a data repository module 712, a screening policy generator module 713, a transmitter 714, a processor 794, and a storage device 795. The modules and devices described herein can, for example, utilize the processor 794 to execute computer executable instructions and/or include a processor to execute computer executable instructions (e.g., an encryption processing unit, a field programmable gate array processing unit, etc.). It should be understood that the screening policy server 710 can include, for example, other modules, devices, and/or processors known in the art and/or varieties of the illustrated modules, devices, and/or processors.

The receiver 711 receives sensor data and data sets from the one or more sensor platforms. The receiver 711 receives screening policy selections from a plurality of computing devices. The data repository module 712 stores the sensor data, the data sets, and the screening policy selections (e.g., stored in the storage device 795). The screening policy generation module 713 generates the plurality of screening policies based on the stored sensor data, the stored data sets, and the stored screening policy selections. The transmitter 714 transmits the plurality of screening policies to the plurality of computing devices and/or the one or more sensor platforms.

In other examples, the screening policy generation module 713 modifies at least one of the plurality of screening policies based on the stored sensor data, the stored data sets, and the stored screening policy selections.

The processor 794 executes the operating system and/or any other computer executable instructions for the screening policy server 710 (e.g., executes applications, etc.). The storage device 795 stores the received data (e.g., actual sensor data, processed radar data, etc.), the identifications, and/or any other data associated with the screening policy server 710. The storage device 795 can store image information and/or any other data associated with the screening policy server 710. The storage device 795 can include a plurality of storage devices and/or screening policy server 710 can include a plurality of storage devices (e.g., a radar storage device, an identification storage device, etc.). The storage device 795 can include, for example, long-term storage (e.g., a hard drive, a tape storage device, flash memory, etc.), short-term storage (e.g., a random access memory, a graphics memory, etc.), and/or any other type of computer readable storage.

Figure 8:
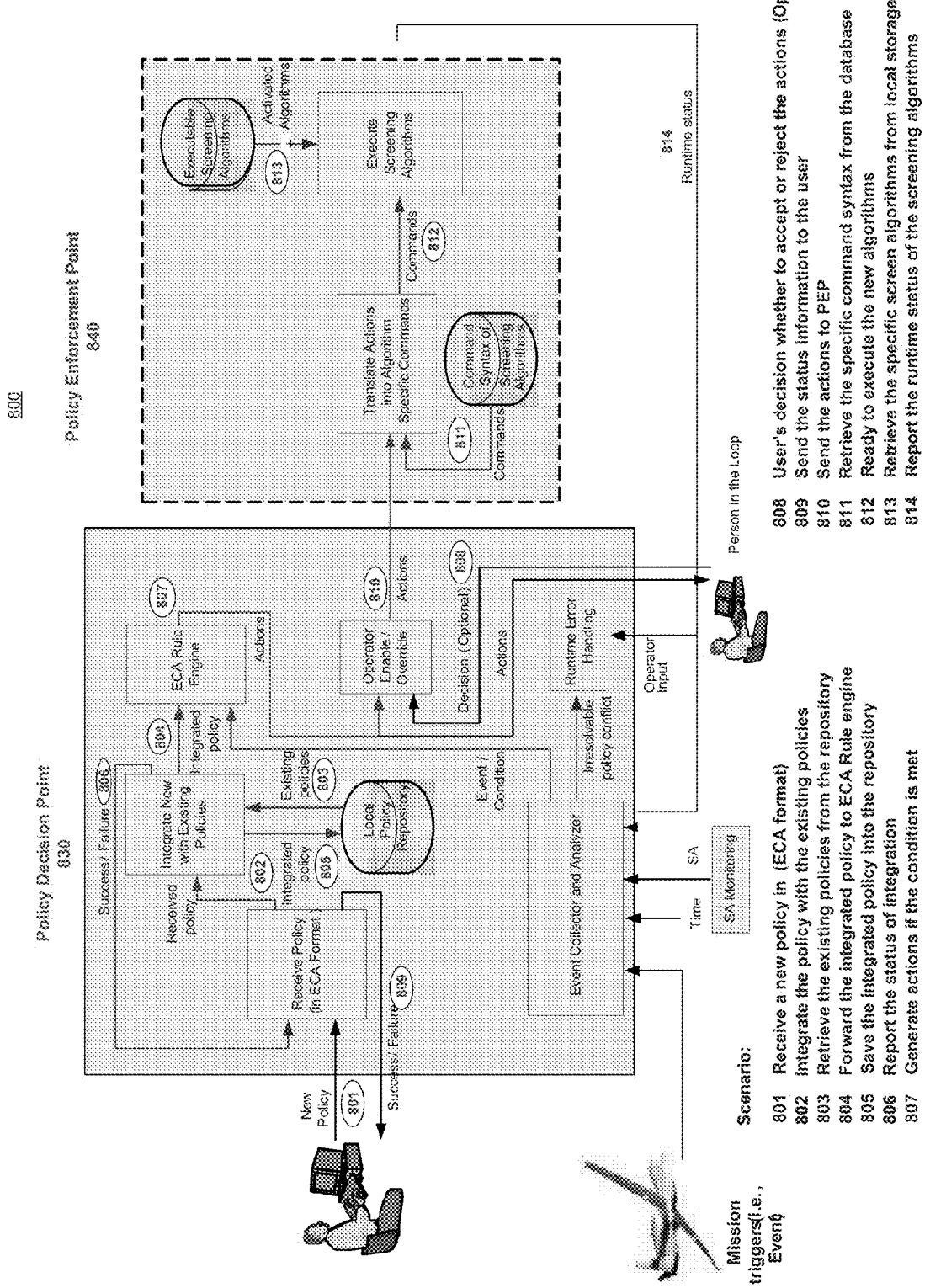
FIG. 8 is a flow diagram of an exemplary policy environment.

FIG. 8 is a flow diagram of an exemplary policy environment 800. The environment 800 includes a policy decision point system 830 and a policy enforcement point system 840. The policy decision point system 830 (can be the policy screening server and/or a part of the policy screening server) receives (801) a new policy. The policy decision point system 830 integrates (802) the new policy with existing policies. The policy decision point system 830 retrieves (803) the existing policies from the repository (e.g., storage device, database, etc.). The policy decision point system 830 forwards (804) the integrated policy to a rules engine. The policy decision point system 830 saves (805) the integrated policy into the repository. The policy decision point system 830 reports (806) the integration of the new policy.

The rules engine generates (807) actions (e.g., email alert, documentation acceptance, etc.) if conditions are met for the new policy being integrated into the policy. A user (i.e., person in the loop) can, in some examples, decide (808) on whether to take the actions. The policy decision point system 830 can send (809) the decision on whether to accept or reject the new policy and/or actions to user transmitting the new policy. The policy decision point system 830 sends (810) actions to the policy enforcement point system 840.

The policy enforcement point system 840 (can be the policy screening server and/or a part of the policy screening server) retrieves (811) the specific command syntax from a database of screening techniques. The policy enforcement point system 840 readies (812) the new screening policies for execution. The policy enforcement point system 840 retrieves (813) the specific screening techniques from a storage device and reports (814) the runtime status of the screening policy. The generation and verification of the screening policies utilizing the process described herein advantageously enables the integration of new policies within the existing screening policies in an efficient and cost-effective manner.

Figure 9:
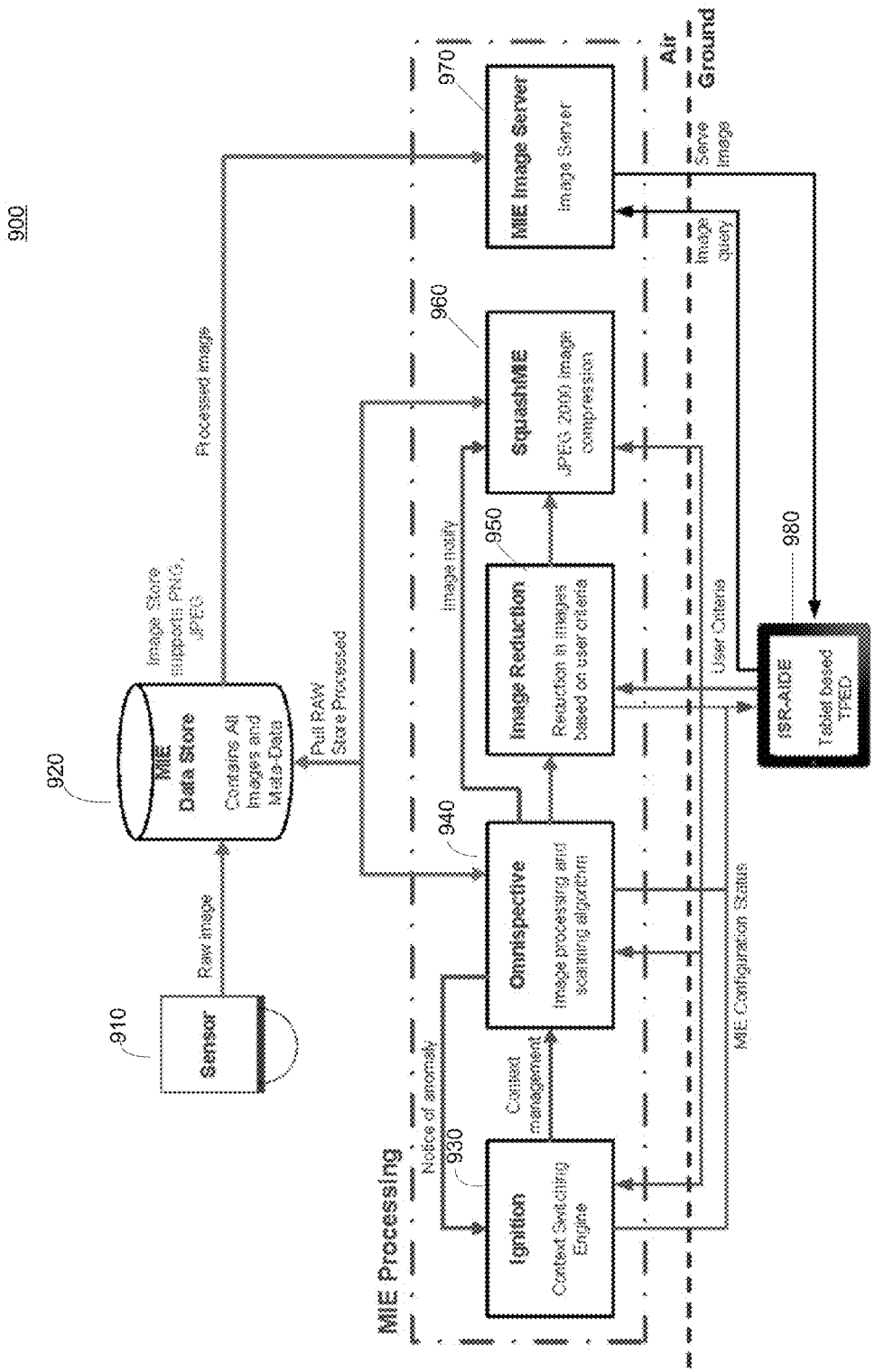
FIG. 9 is a block diagram of an exemplary image access and storage process.

FIG. 9 is a block diagram of an exemplary image access and storage process 900. A sensor 910 senses raw image data (also referred to as sensor data) and transmits the raw image data to a data store 920. The data store 920 stores the raw image data and transits the processed image to an image server 970 upon request. The storage of the raw and processed images in the data store 920 advantageously enables long-term storage and retrieval of the images by users upon request without overburdening the users with all of the images.

An image processing and screening algorithm 940 receives the raw image data from the data store 920. The image processing and screening algorithm 940 processes and screens the raw image data utilizing one or more screening policies (e.g., selected by a user and transmitted from a computing device 980, selected by a context switching engine 930, etc.). If the image processing and screening algorithm 940 detects any anomalies with the raw image data, then the image processing and screening algorithm 940 reports the anomaly to the context switching engine 930. The context-switching engine 930 can manage the one or more screening policies based on the anomalies and/or user criteria received from the computing device 980. The image processing algorithm 940 transmits the resultant processed image data to the data store 920. In addition, the image processing algorithm 940 transmits meta-data derived from the processing of the image and other context sensitive input data to the image store 920 for later query.

During the processing and screening algorithm 940 activity, if the image processing and screening algorithm 940 detects any interesting objects, then the processing and screening algorithm 940 can decide to transmit the screened image data to an image reduction algorithm 950 in order to filter, resulting in higher quality end-user imagery yield, i.e., reduction in non-interesting images based on user criteria. Upon completion of processing and screening, the image processing and screening algorithm 940 transmits the screened image data to an image reduction algorithm 950. The image reduction algorithm 950 processes the image data for reduction based on user criteria received from the computing device 980. Based upon satisfactory reduction test passage, i.e., user criteria quality thresholds (e.g., image size, image quality, image scale, etc.) being met, the image reduction algorithm 950 sends a notification to the image compression algorithm 960. After the processing, the image reduction algorithm 950 sends the resulting image data to the image compression algorithm 960. The image compression algorithm 960 compresses the reduced image based on user criteria received from the computing device 980 for compression quality and other compression processing algorithms settings. The image compression algorithm 960 transmits all reduced image data and associated meta-data derived from the compression process to the image store 920. The compression of the image advantageously enables the technology to automatically adjust the image quality/compression to different data links between the sensor platform and the computing device, while at the same time allowing user criteria received from the computing device 980 to override automatic settings and processing. For example, if the computing device and the sensor platform both utilize a high bandwidth data link, then the image can be transmitted in an uncompressed format. As another example, if the computing device and the sensor platform both utilize a low bandwidth data link, the image can be minimized for transmission and the user, utilizing the computing device, can access the uncompressed image later via the image server 970 process described herein.

The computing device 980 can receive images from the image reduction algorithm 950 and/or the image server 970. For example, a user utilizing the computing device 980 can view a partial image from the image reduction algorithm 950 and then query the image server 970 for all related images. A query can be based up on meta-data stored in the image store 920 and processed by the image server 970. Meta-data includes geo-location data, temporal data, sensor data, image processing and screening algorithm 940 data and contextual information, and image compression data 960. The image server 970 returns the requested images or textual list of imagery information to the computing device 980 for display to the user. The user of the computing device can manually or automatically utilize the image screening and reduction process described in the process 900 to reduce the network bandwidth to the computing device 980 and/or reduce the images for review. The user of the computing device 980 can also augment an image's meta-data via submittal of deleted, modified or new information to the imagery server 970.

Figure 10:
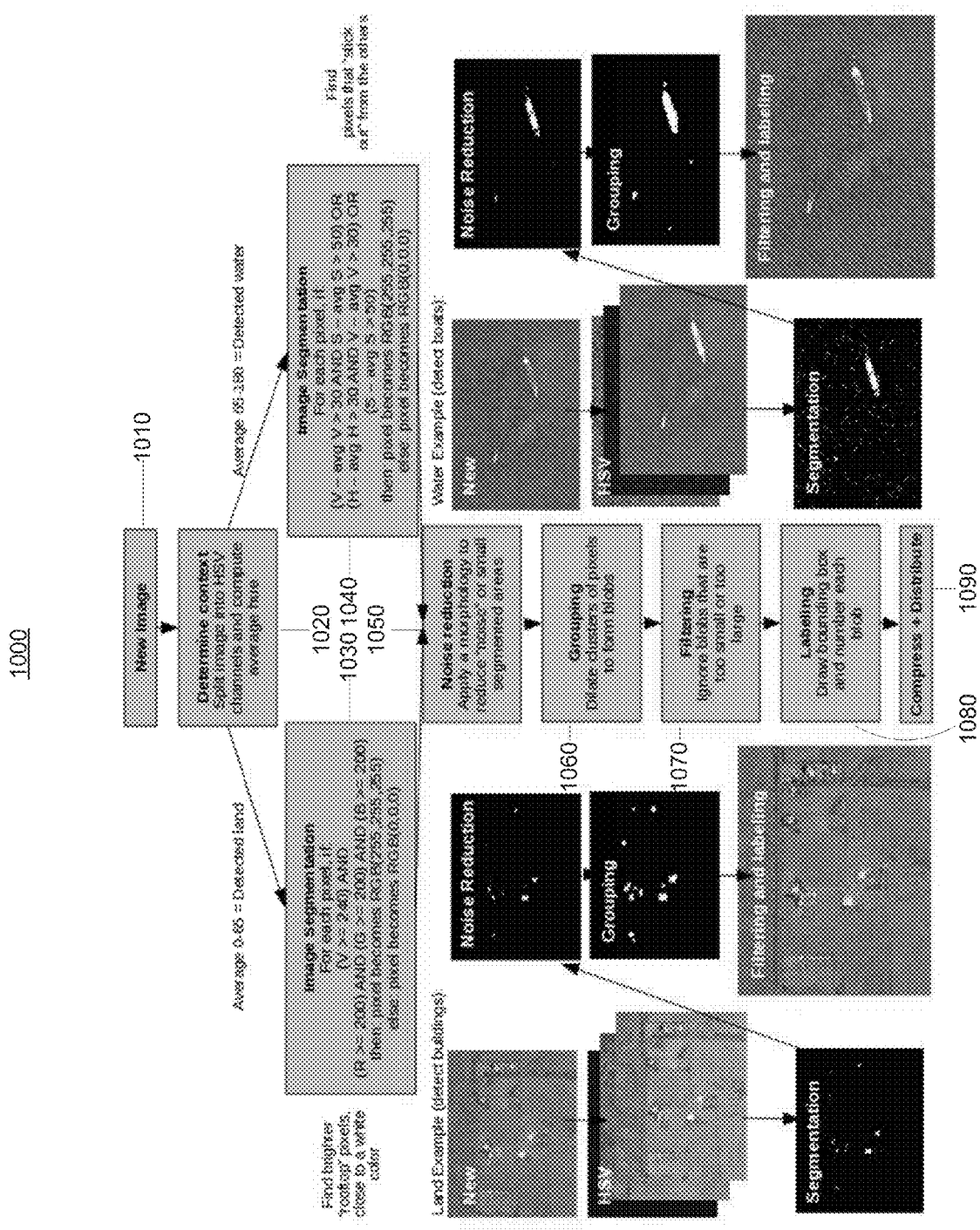
FIG. 10 illustrates an exemplary data process.

FIG. 10 illustrates an exemplary data process 1000 utilizing, for example, the sensor platform 114 of FIG. 1. The sensor platform 114, via a processor and/or storage device, receives (1010) a new image. The sensor platform 114 determines (1020) a context for the image. In a first example (i.e., a first new image for a first screening policy), the detected context is land. In a second example (i.e., the first new image for a second screening policy), the detected context is water. In this example, the first new image includes a part with land and another part with water. In other words, the sensor platform 114 can perform the same process to the same image with different screening policies and thus, different parameters for the process (as illustrated in FIG. 10). In other examples, a context switching engine determines the screening policy based on the determined context.

In the first example, the sensor platform 114 segments (1030) the new image. The sensor platform 114 reduces (1040) the noise for the segmented image (e.g., utilizing any type of standard noise reduction). The sensor platform 114 groups (1060) the segmented images (e.g., grouping based on number of target objects, etc.). The sensor platform 114 filters (1070) (e.g., white noise filter, etc.) and labels (1080) (e.g., associated annotations with the image) the image. The sensor platform 114 compresses (e.g., utilizing any type of standard image compression, etc.) and distributes (1090) (e.g., file transfer protocol, etc.) the image to the computing device(s) associated with the first screening algorithm.

In the second example, the sensor platform 114 segments (1040) the new image. The sensor platform 114 reduces (1040) the noise for the segmented image. The sensor platform 114 groups (1060) the segmented images. The sensor platform 114 filters (1070) and labels (1080) the image. The sensor platform 114 compresses and distributes (1090) the image to the computing device(s) associated with the first screening algorithm.

Figure 11:
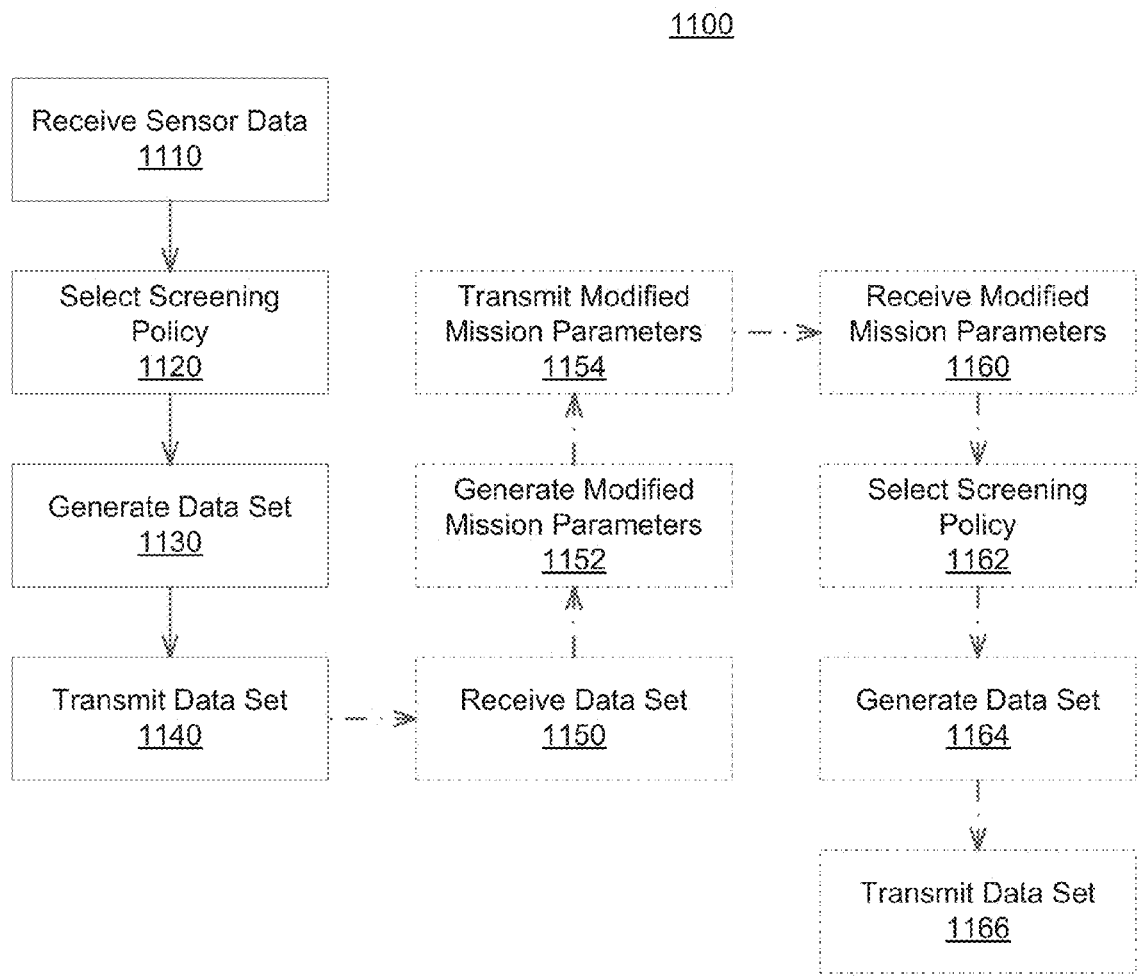
FIG. 11 is a flowchart of an exemplary method for policy-based data management.

FIG. 11 is a flowchart of an exemplary method 1100 for policy-based data management utilizing, for example, the sensor platform 114 of FIG. 1 (also referred to as the sensor platform device) and/or the computing device 130 of FIG. 1. The sensor platform 114 receives (1110) sensor data from one or more sensors. The sensor platform 114 selects (1120) one or more screening policies from a plurality of screening policies based on one or more mission parameters and a platform type associated with the sensor platform device. The sensor platform 114 generates (1130) a data set from the sensor data based on the selected one or more screening policies. The sensor platform 114 transmits (1140) the data set to one or more computing devices.

In some examples, the computing device 130 receives (1150) data sets from a plurality of sensor platform devices. The computing device 130 generates (1152) one or more modified mission parameters based on input from a user associated with the computing device. The computing device 130 transmits (1154) the one or more modified mission parameters to one or more of sensor platform devices.

In other examples, the sensor platform 114 receives (1160) the one or more modified mission parameters. The sensor platform 114 selects (1162) one or more second screening policies from the plurality of screening policies based on the one or more modified mission parameters and the platform type associated with the sensor platform device. The sensor platform 114 generates (1164) a second data set from the sensor data based on the selected one or more second screening policies. The sensor platform 114 transmits (1166) the second data set to the computing device.

In some examples, the sensor platform 114 receives the one or more modified mission parameters. The sensor platform 114 receives second sensor data from the one or more sensors. The sensor platform 114 selects one or more second screening policies from the plurality of screening policies based on the one or more modified mission parameters and the platform type associated with the sensor platform device. The sensor platform 114 generates a second data set from the second sensor data based on the selected one or more second screening policies. The sensor platform transmits the second data set to the computing device.

In other examples, the sensor platform 114 determines a data link parameter (e.g., 50 mega bytes per second, 256 bytes per second, etc.) associated with a data link between the sensor platform device and at least one of the one or more computing devices. The sensor platform 114 generates one or more image chips from the sensor data based on the data link parameter and one or more image parameters (e.g., an image chip is a frame of a video, an image chip is an image that shows an entire truck, etc.). The one or image parameters are received from one or more users associated with the at least one of the one or more computing devices and the sensor data includes image data, video data, and/or audio data. The sensor platform 114 transmits the one or more image chips to the least one of the one or more computing devices.

In some examples, the sensor platform 114 determines a data link parameter associated with a data link between the respective sensor platform and the one or more computing devices. The sensor platform 114 dynamically reduces the data set before transmitting based on the data link parameter and the one or more mission parameters. The dynamic reduction of the data set includes a compression technique, and/or a data correlation technique.

In other examples, the one or more mission parameters are pre-determined based on a planned mission associated with the sensor platform device. In some examples, the sensor platform 114 dynamically generates the one or more mission parameters based on one or more real-time mission events.

Figure 12:
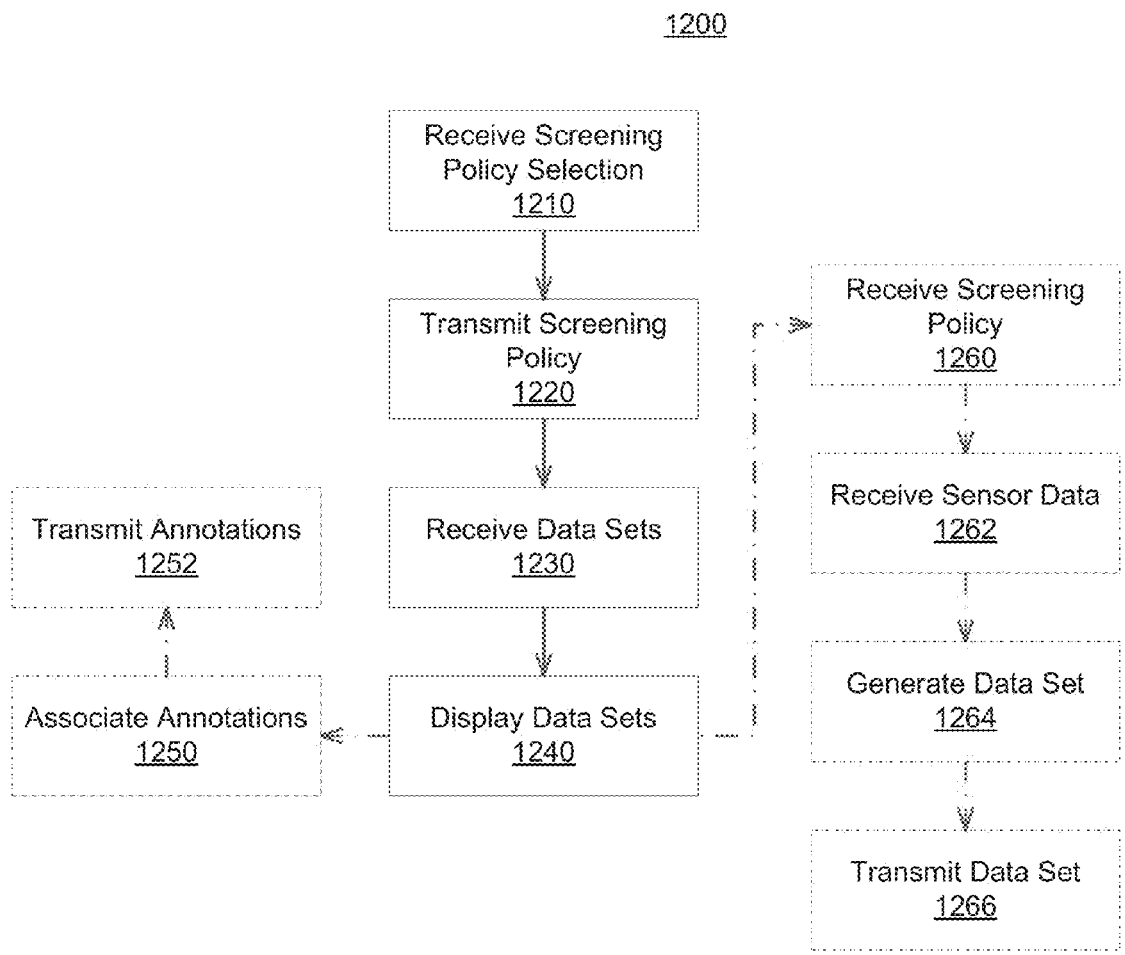
FIG. 12 is a flowchart of an exemplary method for data tasking and visualization of data.

FIG. 12 is a flowchart of an exemplary method 1200 for data tasking and visualization of data utilizing, for example, the sensor platform 114 of FIG. 1 and/or the computing device 130 of FIG. 1. The computing device 130 receives (1210) a screening policy selection from a user associated with the computing device. The screening policy selection is selected from a plurality of screening policies and each of the plurality of screening policies being indicative of a mission event. The computing device 130 transmits (1220) the screening policy selection to one or more sensor platform devices. The computing device 130 receives (1230) one or more data sets from the one or more sensor platform devices in response to the transmission of the screening policy selection. The computing device 130 displays (1240) the one or more data sets to the user.

In some examples, the computing device 130 associates (1250) one or more annotations received from the user with the one or more data sets. The computing device 130 transmits (1252) the one or more annotations to a screening policy server.

In other examples, the sensor platform 114 receives (1260) the screening policy selection from the computing device. The sensor platform 114 receives (1262) sensor data from one or more sensors. The sensor platform 114 generates (1264) a data set from the sensor data based on the screening policy selection. The sensor platform 114 transmits (1266) the data set to the computing device.

In some examples, the sensor platform 114 identifies one or more mission-relevant objects in the sensor data based on the screening policy selection. The sensor data includes image data and/or video data. The sensor platform 114 associates one or more data tags with the sensor data associated with the identified one or more mission-relevant objects based on the mission event. The sensor platform 114 transmits the sensor data associated with the identified one or more mission-relevant objects and the associated one or more data tags to the computing device.

In other examples, the computing device 130 determines a set of screening policies from the plurality of screening policies based on one or more mission parameters. In some examples, the one or more mission parameters include a real-time mission event, a planned mission event, a user preference, and/or a data type associated with the sensor data.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A policy-based data management system, the system comprising:
    one or more sensor platforms, each sensor platform of the one or more sensor platforms comprising:
        a receiver configured to receive sensor data from one or more sensors,
        a data screening policy module configured to automatically select one or more screening policies from a plurality of screening policies based on a combination of one or more of mission parameters from one or more diverse mission phases, environment data, mission event information from one or more diverse mission phases, sensor data, and a platform type associated with the sensor platform,
        a data screening module configured to generate a data set from the sensor data based on the selected one or more screening policies,
        a transmitter configured to transmit the data set to one or more computing devices,
        a data link module configured to determine one or more data link parameters associated with a data link between the respective sensor platform and at least one of the one or more computing devices, and
        a data reduction module configured to dynamically reduce the data set before transmission by the transmitter based on the data link parameters and the one or more mission parameters from one or more diverse mission phases.

2. The system of claim 1, further comprising:
    the one or more computing devices, each computing device of the one or more computing devices comprising:
    a receiver configured to receive one or more data sets from at least one of the one or more of the sensor platforms,
    a display device configured to display the received data sets,
    a mission parameter module configured to generate one or more modified mission parameters from one or more diverse mission phases based on input from a user associated with the computing device, and
    a transmitter configured to transmit the one or more modified mission parameters to at least one of the one or more of the sensor platforms.

3. The system of claim 2, each of the one or more sensor platforms further comprises:
    the receiver further configured to receive second sensor data from one or more sensors, the data screening policy module further configured to select a second set of one or more screening policies from the plurality of screening policies based on the one or more modified mission parameters and the platform type associated with the sensor platform, the data screening module further configured to generate a second data set from the second sensor data based on the selected second set of one or more screening policies, and the transmitter further configured to transmit the second data set to the one or more computing devices.

4. The system of claim 1, wherein the sensor data comprises image data, video data, audio data, or any combination thereof; and each of the one or more sensor platforms further comprises:

a data link module configured to determine one or more data link parameters associated with a data link between the respective sensor platform and at least one of the one or more computing devices; and a multimedia chipping module configured to generate one or more image chips from the sensor data based on the data link parameters and one or more image parameters, the one or more image parameters are received from one or more users associated with the at least one of the one or more computing devices.

5. The system of claim 4, wherein the one or image parameters comprise an image chipping technique, a user preference, a user selected focus area, or any combination thereof.

6. The system of claim 1, wherein the one or more mission parameters from one or more diverse mission phases comprises a real-time mission event, a planned mission event, a user preference, a data type associated with the sensor data, or any combination thereof.

7. The system of claim 1, wherein the plurality of screening policies comprise a model-based policy, a statistics-based policy, a learning-based policy, an event-driven policy, or any combination thereof.

8. The system of claim 1, wherein each of the sensor platforms comprises the one or more sensors from one or more sensor platform devices.

9. A method for policy-based data management, the method comprising:

receiving, by a sensor platform device, sensor data from one or more sensors;

selecting, by the sensor platform device, one or more screening policies from a plurality of screening policies based on one or more mission parameters from one or more diverse mission phases and a platform type associated with the sensor platform device;

generating, by the sensor platform device, a data set from the sensor data based on the selected one or more screening policies;

transmitting, by the sensor platform device, the data set to one or more computing devices;

determining, by the sensor platform device, one or more data link parameters associated with a data link between the respective sensor platform and the one or more computing devices; and dynamically reducing, by the sensor platform device, the data set before transmitting based on the data link parameters and the one or more mission parameters.

10. The method of claim 9, further comprising:

receiving, by a computing device, data sets from a plurality of sensor platform devices;

generating, by the computing device, one or more modified mission parameters from one or more diverse mission phases based on input from a user associated with the computing device; and transmitting, by the computing device, the one or more modified mission parameters from one or more diverse mission phases to one or more of sensor platform devices.

11. The method of claim 10, further comprising:

receiving, by the sensor platform device, the one or more modified mission parameters from one or more diverse mission phases;

selecting, by the sensor platform device, one or more second screening policies from the plurality of screening policies based on the one or more modified mission parameters from one or more diverse mission phases and the platform type associated with the sensor platform device;

generating, by the sensor platform device, a second data set from the sensor data based on the selected one or more second screening policies; and transmitting, by the sensor platform device, the second data set to the computing device.

12. The method of claim 10, further comprising:

receiving, by the sensor platform device, the one or more modified mission parameters from one or more diverse mission phases;

receiving, by the sensor platform device, second sensor data from the one or more sensors;

selecting, by the sensor platform device, one or more second screening policies from the plurality of screening policies based on the one or more modified mission parameters and the platform type associated with the sensor platform device;

generating, by the sensor platform device, a second data set from the second sensor data based on the selected one or more second screening policies; and transmitting, by the sensor platform device, the second data set to the computing device.

13. The method of claim 9, further comprising:

determining, by the sensor platform device, one or more data link parameters associated with a data link between the sensor platform device and at least one of the one or more computing devices;

generating, by the sensor platform device, one or more image chips from the sensor data based on the data link parameter and one or more image parameters, the one or image parameters are received from one or more users associated with the at least one of the one or more computing devices and the sensor data comprises image data, video data, audio data, or any combination thereof; and transmitting, by the sensor platform device, the one or more image chips to the least one of the one or more computing devices.

14. The method of claim 9, wherein the one or more mission parameters from one or more diverse mission phases are pre-determined based on a planned mission associated with the sensor platform device.

15. The method of claim 9, further comprising dynamically generating, by the sensor platform device, the one or more mission parameters from one or more diverse mission phases based on one or more real-time mission events.

16. A computer program product, tangibly embodied in an information carrier, the computer program product including instructions being operable to cause a data processing apparatus to:

implement one or more sensor platforms, each sensor platform of the one or more sensor platforms configured to:

receive sensor data from one or more sensors;
select one or more screening policies from a plurality of screening policies based on one or more mission parameters and a platform type associated with the sensor platform device;
generate one or more data sets from the sensor data based on the selected one or more screening policies;
transmit the data sets to one or more computing devices; and
determining, by the sensor platform device, one or more data link parameters associated with a data link between the respective sensor platform and the one or more computing devices; and
dynamically reducing, by the sensor platform device, the data set before transmitting based on the data link parameter and the one or more mission parameters from one or more diverse mission phases.

* * * * *